United States Patent
Short et al.

(10) Patent No.: US 12,337,546 B2
(45) Date of Patent: Jun. 24, 2025

(54) ULTRASONIC CONSOLIDATION OF MATERIALS

(71) Applicant: Agile Ultrasonics Corp., Hilliard, OH (US)

(72) Inventors: Matthew A. Short, Columbus, OH (US); James Stratton, Columbus, OH (US)

(73) Assignee: Agile Ultrasonics Corp., Hilliard, OH (US)

( * ) Notice: Subject to any disclaimer, the term of this patent is extended or adjusted under 35 U.S.C. 154(b) by 253 days.

(21) Appl. No.: 17/890,713

(22) Filed: Aug. 18, 2022

(65) Prior Publication Data

US 2023/0059804 A1  Feb. 23, 2023

Related U.S. Application Data

(60) Provisional application No. 63/234,445, filed on Aug. 18, 2021.

(51) Int. Cl.
*B32B 41/00* (2006.01)
*B29C 65/00* (2006.01)
(Continued)

(52) U.S. Cl.
CPC .............. *B29C 65/08* (2013.01); *B29C 66/41* (2013.01); *B29C 66/7212* (2013.01); *B29C 66/7392* (2013.01); *B29C 66/7394* (2013.01); *B29C 66/9121* (2013.01); *B29C 66/92* (2013.01); *B29K 2307/04* (2013.01);
(Continued)

(58) Field of Classification Search
CPC ..... B29C 65/08; B29C 66/41; B29C 66/7212; B29C 66/7392; B29C 66/7394; B29C 66/9121; B29C 66/92; B29C 65/7841; B29C 66/0242; B29C 66/0244; B29C 66/034; B29C 66/0342; B29C 66/45; B29C 66/472; B29C 66/73921; B29C 66/81419; B29C 66/836; B29C 66/71; B29C 66/86533; B29C 66/1122; B29C 66/73941; B29C 66/8145; B29C 66/81815; B29C 66/8322; B29C 66/91212; B29C 66/91231; B29C 66/9221; B29C 35/0261; B29C 70/06; B29K 2307/04; B29K 2995/0012;
(Continued)

(56) References Cited

U.S. PATENT DOCUMENTS

2007/0257086 A1 * 11/2007 Schroeder ......... B29C 66/73921
228/101

FOREIGN PATENT DOCUMENTS

WO   WO-2017220327 A1 * 12/2017 ............. B23K 20/10

* cited by examiner

*Primary Examiner* — Michael N Orlando
*Assistant Examiner* — Joshel Rivera

(57) ABSTRACT

A system for consolidating materials, comprising a sonotrode configured to direct ultrasonic energy into materials to be consolidated, wherein the materials to be consolidated have both a glass transition temperature and a melting temperature; a non-rigid consolidating material in proximity to the sonotrode, wherein the non-rigid consolidating material and sonotrode define a region therebetween for receiving the materials to be consolidated, and wherein the non-rigid consolidating material has a glass transition temperature that is higher than the glass transition temperature of the materials to be consolidated and a melting temperature that is higher than the melting temperature of the materials to be consolidated.

20 Claims, 8 Drawing Sheets

(51) Int. Cl.
*B29C 65/08* (2006.01)
*B29K 307/04* (2006.01)
*B29L 9/00* (2006.01)

(52) U.S. Cl.
CPC .................. *B29K 2995/0012* (2013.01); *B29K 2995/007* (2013.01); *B29L 2009/00* (2013.01)

(58) Field of Classification Search
CPC .......... B29K 2995/007; B29K 2101/10; B29K 2101/12; B29K 2105/0872; B29L 2009/00
USPC .................... 156/60, 64, 350, 351, 378, 379
See application file for complete search history.

ULTRASONIC CONSOLIDATION OF MATERIALS

CROSS-REFERENCE TO RELATED APPLICATIONS

This patent application claims the benefit of U.S. Provisional Patent Application Ser. No. 63/234,445 filed on Aug. 18, 2021 and entitled "System and Method for Ultrasonic Consolidation of Carbon Fiber Reinforced Polymer Materials", the disclosure of which is hereby incorporated by reference herein in its entirety and made part of the present U.S. utility patent application for all purposes.

BACKGROUND

The disclosed inventive subject matter relates in general to manufacturing and fabricating systems, devices, and methods, and more specifically to a system, device, and method for ultrasonic consolidation of materials such as, for example, materials containing carbon fiber.

The use of ultrasonic welding processes to weld multiple layers of carbon fiber reinforced polymers (CFRP) into consolidated structures has proven largely unsuccessful without the use of energy directors or a sacrificial melt layer; or when the anvil component of an ultrasonic welding system includes a rigid surface against which layers of CFRP have been placed. Known welding practices fixture thermoplastic or thermoplastic composites against a rigid anvil; however, if these practices are used with CFRP tapes, braids, or pre-consolidated plates, welds cannot typically be achieved, without employing the use of traditional energy directors or secondary materials for enhancing the welding process. If welds are indeed achieved, the welds are often of an unsatisfactory nature. Accordingly, there is an ongoing need for an ultrasonic welding system that can effectively consolidate CFRP tapes into solid structures for use in a variety of applications, including automotive, aeronautic, and military applications.

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

An example implementation of the disclosed technology provides a first system for consolidating materials. This system comprises a sonotrode configured to direct ultrasonic energy into materials to be consolidated, wherein the materials to be consolidated have both an inherent glass transition temperature and an inherent melting temperature; a non-rigid consolidating material in proximity to the sonotrode, wherein the non-rigid consolidating material and sonotrode define a region therebetween for receiving the materials to be consolidated, and wherein the non-rigid consolidating material has an inherent glass transition temperature that is higher than the inherent glass transition temperature of the materials to be consolidated and an inherent melting temperature that is higher than the inherent melting temperature of the materials to be consolidated.

The system may further comprise a rigid anvil for supporting the non-rigid consolidating material. The system may further comprise at least one force sensor and at least one thermal sensor. The system may further comprise an incoming material anvil positioned on one side of the sonotrode and an outgoing material anvil positioned on the opposite side of the sonotrode, wherein the anvils are configured to provide compressive force on the materials being consolidated, and wherein the anvils are configured to either cool or heat the materials being consolidated. The system may further comprise at least one ultrasonic transducer configured to provide ultrasonic energy to the sonotrode, wherein the at least one ultrasonic transducer is mounted in an articulated housing, and wherein the articulating housing is configured to provide the sonotrode with compressive force and varying angles of contact (or attack) relative to placement of the materials to be consolidated (i.e., approaching surface normal with respect to complex surface geometries). The sonotrode may include a radiused or tapered face profile, and the sonotrode may be configured for consolidating either narrow components of a predetermined width or wide components of a predetermined width. The sonotrode may include integrated hold-down structures configured to contact the materials being consolidated. The materials to be consolidated may be thermoplastic materials, thermoset materials, or carbon fiber reinforced polymers and may be configured as layers of material or sheets of material. The non-rigid consolidating material may include thermoplastic material, thermoset material, silicone, polyamide, urethane, rubber, glass woven sheets, glass, carbon fiber material, or various combinations thereof and may be configured as layers of material, sheets of material, or preconsolidated structures. The non-rigid consolidating material may have a hardness between 40 and 100 Shore A.

Another example implementation of the disclosed technology provides a second system for consolidating materials. This system comprises at least one ultrasonic transducer configured to provide ultrasonic energy to a sonotrode, wherein the at least one ultrasonic transducer is mounted in an articulated housing configured to provide the sonotrode with compressive force and varying angles of contact relative to placement of the materials to be consolidated, wherein the sonotrode is configured to direct ultrasonic energy into materials to be consolidated, and wherein the materials to be consolidated have both an inherent glass transition temperature and an inherent melting temperature; a non-rigid consolidating material in proximity to the sonotrode, wherein the non-rigid consolidating material and sonotrode define a region therebetween for receiving the materials to be consolidated, and wherein the non-rigid consolidating material has an inherent glass transition temperature that is higher than the inherent glass transition temperature of the materials to be consolidated and an inherent melting temperature that is higher than the inherent melting temperature of the materials to be consolidated; and an incoming material anvil positioned on one side of the sonotrode and an outgoing material anvil positioned on the opposite side of the sonotrode, wherein the anvils are configured to provide additional compressive force on the materials being consolidated, and wherein the anvils are configured to either cool or heat the materials being consolidated.

The system may further comprise a rigid anvil for supporting the non-rigid consolidating material. The system may further comprise at least one force sensor and at least one thermal sensor. The sonotrode may include a radiused or tapered face profile, and the sonotrode may be configured for consolidating either narrow components of a predetermined width or wide components of a predetermined width. The sonotrode may include integrated hold-down structures configured to contact the materials being consolidated. The materials to be consolidated may be thermoplastic materials, thermoset materials, or carbon fiber reinforced polymers and may be configured as layers of material, sheets of material, or preconsolidated structures. The non-rigid consolidating material may include thermoplastic material, thermoset material, silicone, polyamide, urethane, rubber, glass woven sheets, glass, carbon fiber material, or various combinations thereof and may be configured as layers of material or sheets of material. The non-rigid consolidating material may have a hardness between 40 and 100 Shore A.

Still another example implementation of the disclosed technology provides a method for consolidating materials. This method comprises configuring a sonotrode to direct ultrasonic energy into materials to be consolidated and exert compressive force on the materials to be consolidated, wherein the materials to be consolidated have both an inherent glass transition temperature and an inherent melting temperature; placing a non-rigid consolidating material in proximity to the sonotrode, wherein the non-rigid consolidating material and sonotrode define a region therebetween for receiving the materials to be consolidated, and wherein the non-rigid consolidating material has an inherent glass transition temperature that is higher than the inherent glass transition temperature of the materials to be consolidated and an inherent melting temperature that is higher than the inherent melting temperature of the materials to be consolidated; and joining the materials to be consolidated by activating the sonotrode and moving the sonotrode across the materials under compressive force.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein.

DETAILED DESCRIPTION

Figure 1A:
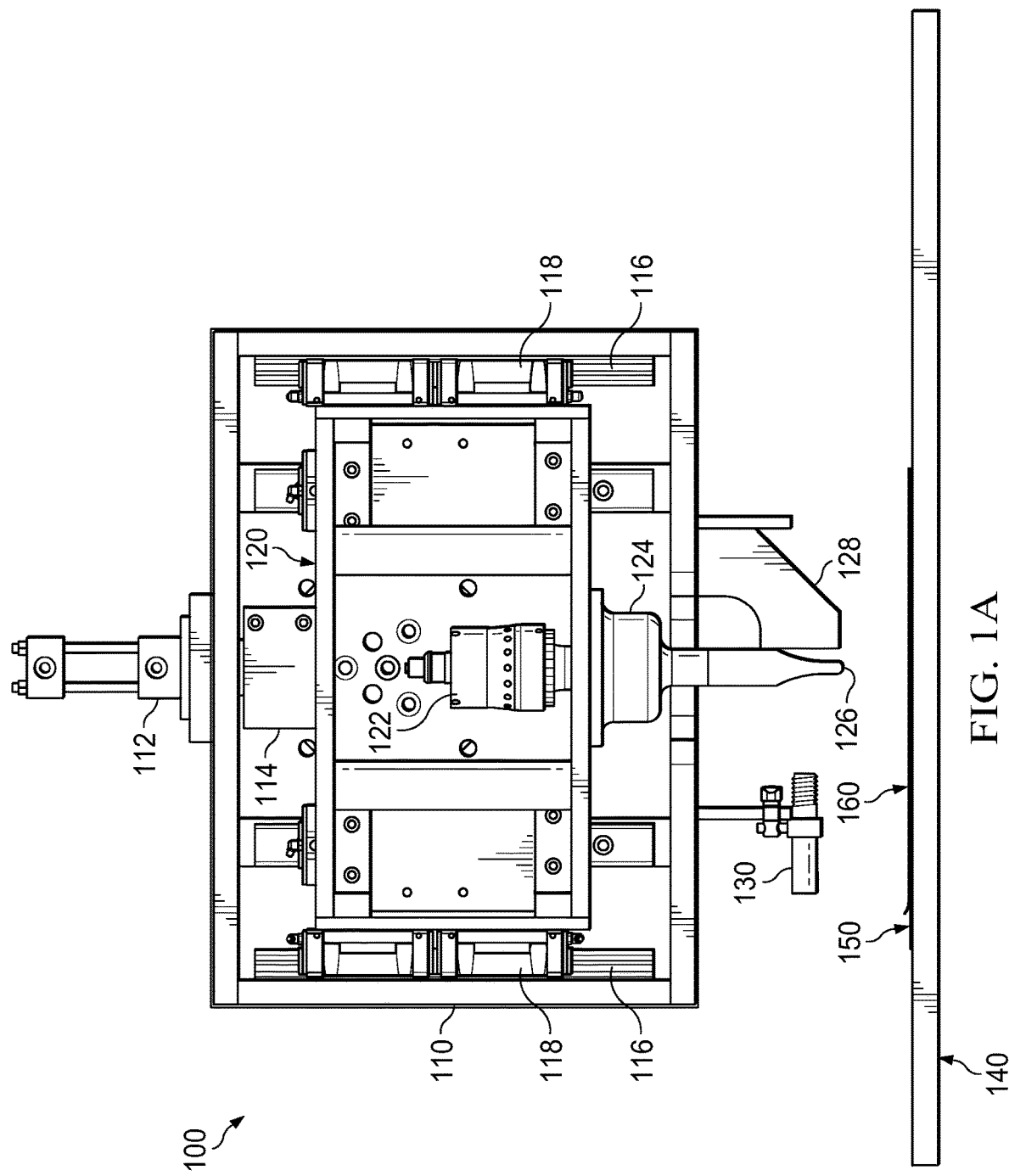
FIG. 1A is a front view of a system and apparatus for the ultrasonic consolidation of materials, in accordance with a first example implementation of the disclosed technology.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

The disclosed technology provides systems, devices, and methods for ultrasonic consolidation of multiple layers of certain types of materials into laminate structures. With reference to the Figures, a generic example implementation of the disclosed system includes an ultrasonic stack (ultrasonic transmission line) that further includes an ultrasonic transducer, an ultrasonic booster, and an ultrasonic horn (sonotrode). The components of the ultrasonic stack are mounted within an articulating head assembly that is pressed downward (or toward the material being consolidated) with static force and that is moved in a lateral system motion. A power supply drives the ultrasonic transducer into ultrasonic vibrations that are transmitted through the ultrasonic booster and the sonotrode into multiple layers of target material, thereby causing the layers of material to be joined together (i.e., consolidated). The layers of material to be consolidated may be placed on a substrate having specific non-rigid, elastic, or compliant properties (referred to as a "consolidating material") and the substrate itself typically rests on a rigid support referred to as an anvil, although in some implementations, the substrate itself acts as the anvil. The sonotrode may be configured in various widths such as, for example, narrow for use in welding tapes of material or wide for welding sheets of material. The anvil may supported by a main processing surface having rigid characteristics. Although the main processing surface can remain stationary, incorporating multiple degrees of freedom, such as X-, Y-, Z-, I-, J, or K-axis movement, or any combination thereof, facilitates a means for spot welding or continuous scan welding of materials across complex surface geometries.

The articulating head assembly of the disclosed technology may be provided in numerous alternate configurations. In one implementation, the head assembly includes a rigid housing affixed to a supporting structure. Actuation of the ultrasonic transmission line can be performed with a pneumatic, hydraulic, or electro-mechanical device for exerting force on the materials to be consolidated. In another implementation, the head assembly includes a rigid housing affixed to the end of a numerically controlled multi-axis system in which the system structure has self-contained actuation for exerting force on the materials to be consolidated. In still another implementation, the head assembly includes a rigid housing affixed to the end of a robotically controlled articulating network of joints. Applying force to the materials to be consolidated can be accomplished by the network of robotic joints, and/or through a pneumatic, hydraulic, or electro-mechanical device contained within the housing. The disclosed welding system may also include a real time force sensor coupled between the articulating head assembly and force application actuator device for providing real-time feedback to the actuation device to provide increased or decreased force for delivering varying energy per unit area, thereby altering processing temperatures to be more suitable for consolidating the target material.

In an example implementation, the disclosed system includes an ultrasonic transmission line having a transducer with a resonant frequency between 10-kHz and 60-kHz, a booster facilitating rigid attachment of the transmission line to an articulating device while also amplifying or de-amplifying amplitude from the transducer, and an ultrasonic sonotrode for applying force as well as subjecting the material to be consolidated to intense ultrasonic vibrations for creating change in the material. Each component of the transmission line is designed to be ½ wavelength of the operating frequency. An array of ½ wavelength components can be installed to the transmission line. One example implementation requires only three components producing 1 and ½ wavelengths.

In an example implementation, the disclosed system includes an ultrasonic sonotrode having a radiused or tapered face profile that produces an ironing effect aligning fibers in the proper orientation of the layup (consolidated materials). Furthermore, utilizing a trailing backing bar which applies compressive force during solidification of the materials to be consolidated eliminates voids between subsequent layers.

In an example implementation, the disclosed welding system includes a thermally controlled contoured backing anvil providing consistent and uniform compressive force to the target materials during solidification. Moreover, the thermally controlled backing anvil may have temperature zones controlled with heating elements suitable for altering the cooling rate of the target materials, thereby influencing the performance of the materials and its end performance through a heat treatment process controlled by the thermally contoured backing anvil. This specifically controlled cooling rate function produces specifically tailored material properties of the consolidated materials.

In an example implementation, the disclosed system includes real-time thermal monitoring sensors that measure incoming and outgoing processing temperatures. Outfeed temperature sensors are important because fluctuations in temperature are altered by increasing/decreasing amplitude values within the ultrasonic transducer. Fluctuations in temperature are also altered by increasing/decreasing traversing velocity of the ultrasonic sonotrode across the materials to be consolidated. Fluctuations in temperature are also altered by increasing/decreasing both traversing velocity and applied amplitude of the ultrasonic sonotrode against the target material.

The disclosed systems, devices, and methods are effective for consolidating certain types of materials such as, for example, thermoplastic materials, thermoset materials, and carbon fiber reinforced polymer (CFRP) sheets or tapes. CFRP may refer to carbon fiber reinforced polymer, carbon fiber reinforced plastic, or carbon fiber reinforced polyethylene. CFRP may also refer to thermoplastic infused carbon fiber. The disclosed technology may be used consolidate numerous layers of thermoplastic or thermoset material. For example, a consolidated object or component made by the disclosed technology may include 2-24 layers of material or pre-consolidated plates or structures. Additional layers of tape, sheet material, or pre-consolidated structures may be used.

When the disclosed system is in operation, use of an appropriate non-rigid substrate material, also referred to as a "release layer" or "consolidating material" creates proper bonding of the layers of material being welded. However, an appropriate consolidating material will not form a bond with materials being consolidated. Such materials may include single or multiple thin layers or sheets of compliant, flexible, or pliable materials such as, by way of non-limiting example, thermoplastic material, thermoset material, silicone, polyamide, urethane, rubber glass woven sheets, glass, carbon fiber material, or various combinations thereof. Teflon (polytetrafluoroethylene (PTFE)) or any other material with similar properties may also be used as the consolidating material. Substrate thickness will vary depending on the thickness of the layers of material being consolidated with substrate thickness decreasing with increasing thickness of the layers being consolidated.

In some implementations, the non-rigid substrate material may not be present and the anvil itself may be made from a compliant, flexible, or pliable material. In one example, processing of carbon fiber reinforced polymer is performed on an elastic backing surface with a hardness between 40 and 100 Shore A. Furthermore, the elastic processing surface must be able to withstand processing temperatures between 150 and 600 degrees Celsius. Prior art ultrasonic processing thermoplastics methods teach the use of a rigid support structure, typically steel or aluminum to ensure consistent transmission of energy into a weld joint. In contrast to prior art systems, utilizing an elastic anvil structure produces an elastic rebound surface while serving as a heat sink-like structure that can be tailored with varying thickness and thermal properties for controlling cooling rates.

Figure 1B:
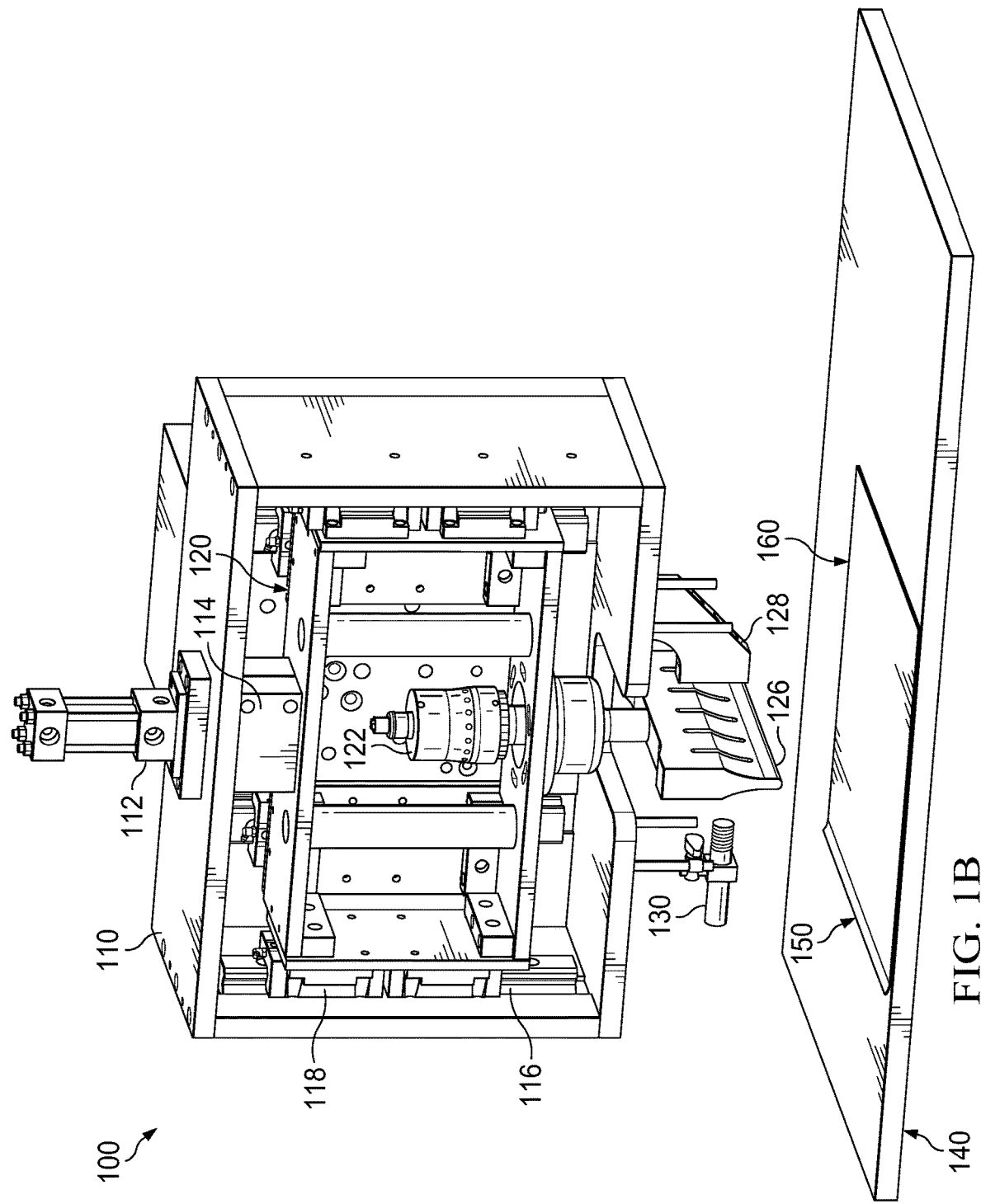
FIG. 1B is a front, perspective view of the system and apparatus of FIG. 1A.

FIG. 1A provides a front view of a system and apparatus for the ultrasonic consolidation of materials, in accordance with a first example implementation of the disclosed technology; and FIG. 1B provides a front, perspective view of the system and apparatus of FIG. 1A. In FIGS. 1A-1B, ultrasonic consolidation system 100 includes enclosure 110; ultrasonic stack actuator 112; closed loop force feedback sensor 114; linear rails 116; and carriages 118, upon which ultrasonic head assembly 120 is mounted. Ultrasonic head assembly 120 includes ultrasonic transducer 122, which is connected to rigid mount booster 124; and ultrasonic sonotrode 126, which is also connected to rigid mount booster 124. Ultrasonic sonotrode lateral support 128 is attached to the bottom portion of enclosure 110, as are thermal sensors 130. Welding anvil 140 supports one or more layers of consolidating material 150; and multiple layers of material to be consolidated 160 are placed between consolidating material 150 and ultrasonic sonotrode 126 during the consolidating process.

Figure 2A:
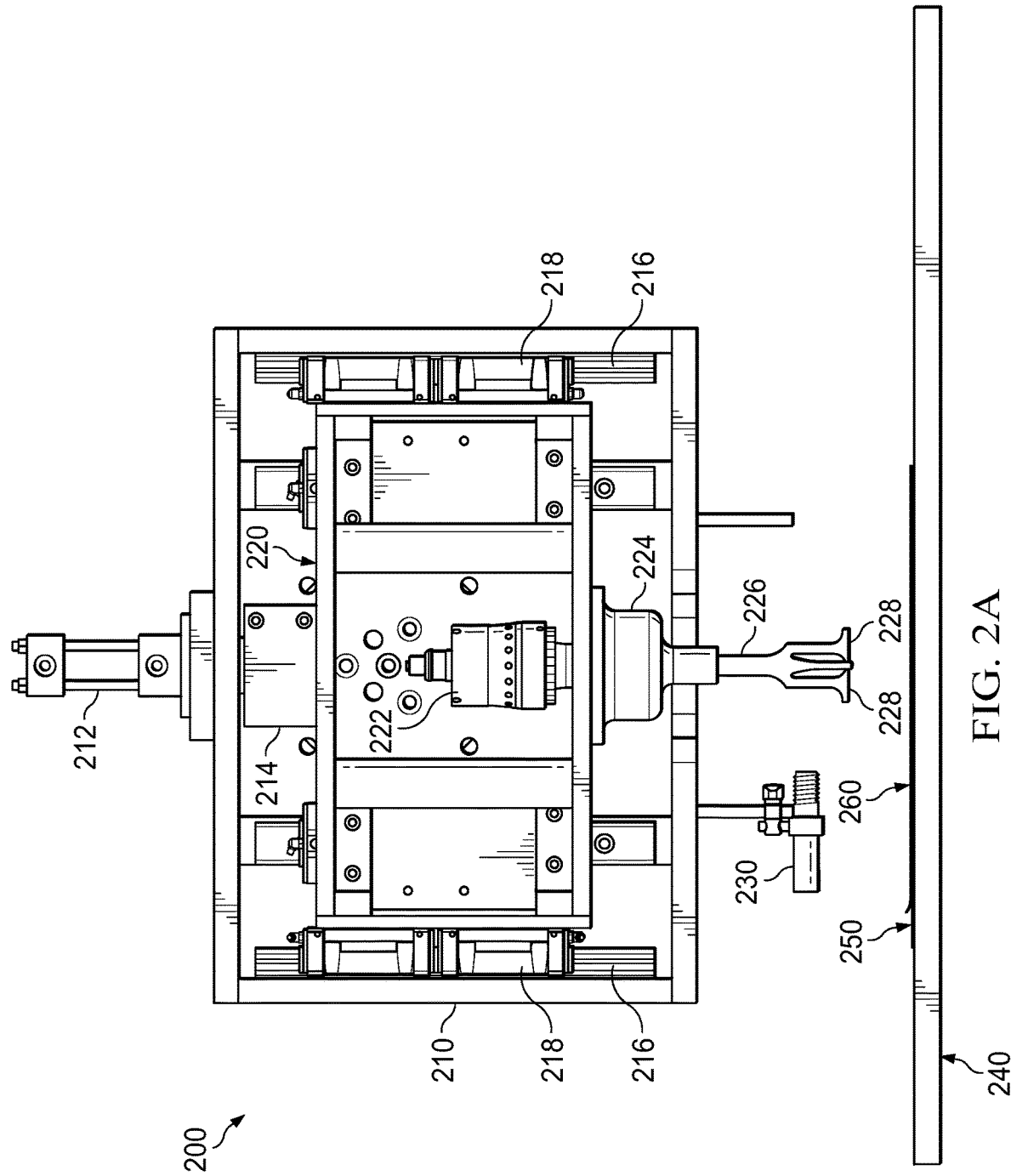
FIG. 2A is a front view of a system and apparatus for the ultrasonic consolidation of materials, in accordance with a second example implementation of the disclosed technology.
Figure 2B:
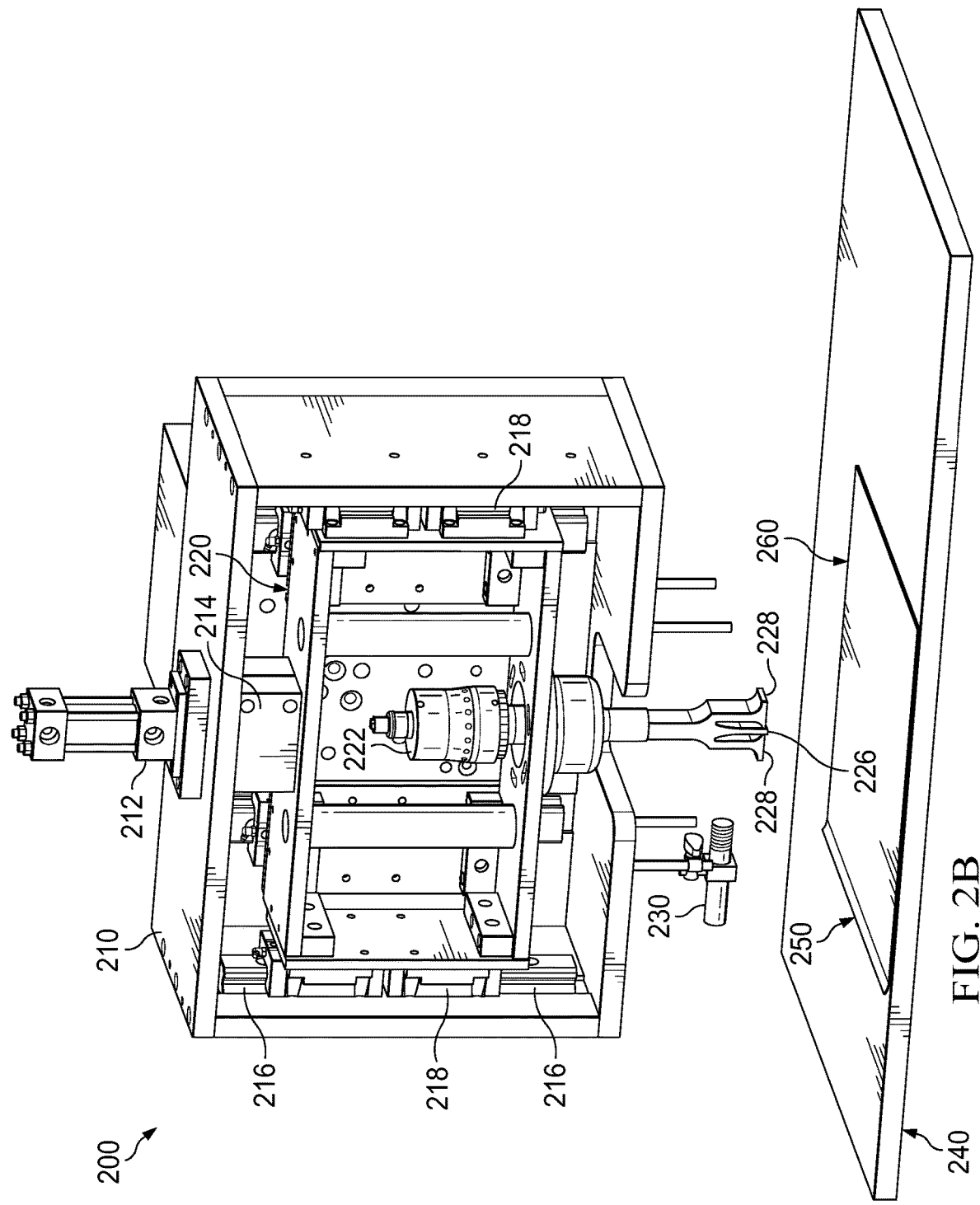
FIG. 2B is a front, perspective view of the system and apparatus of FIG. 2A.

FIG. 2A provides a front view of a system and apparatus for the ultrasonic consolidation of materials, in accordance with a first example implementation of the disclosed technology; and FIG. 2B provides a front, perspective view of the system and apparatus of FIG. 2A In FIGS. 2A-2B, ultrasonic consolidation system 200 includes enclosure 210; ultrasonic stack actuator 212; closed loop force feedback sensor 214; linear rails 216; and carriages 218, upon which ultrasonic head assembly 220 is mounted. Ultrasonic head assembly 220 includes ultrasonic transducer 222, which is connected to rigid mount booster 224; and ultrasonic sonotrode 226, which is also connected to rigid mount booster 224. Thermal sensors 230 are attached to the bottom portion of enclosure 210. An integrated material hold-down structure is formed on both sides of ultrasonic sonotrode 226. Welding anvil 240 supports one or more layers of consolidating material 250; and multiple layers of material to be consolidated 260 are placed between consolidating material 250 and ultrasonic sonotrode 226 during the consolidating process.

Figure 3:
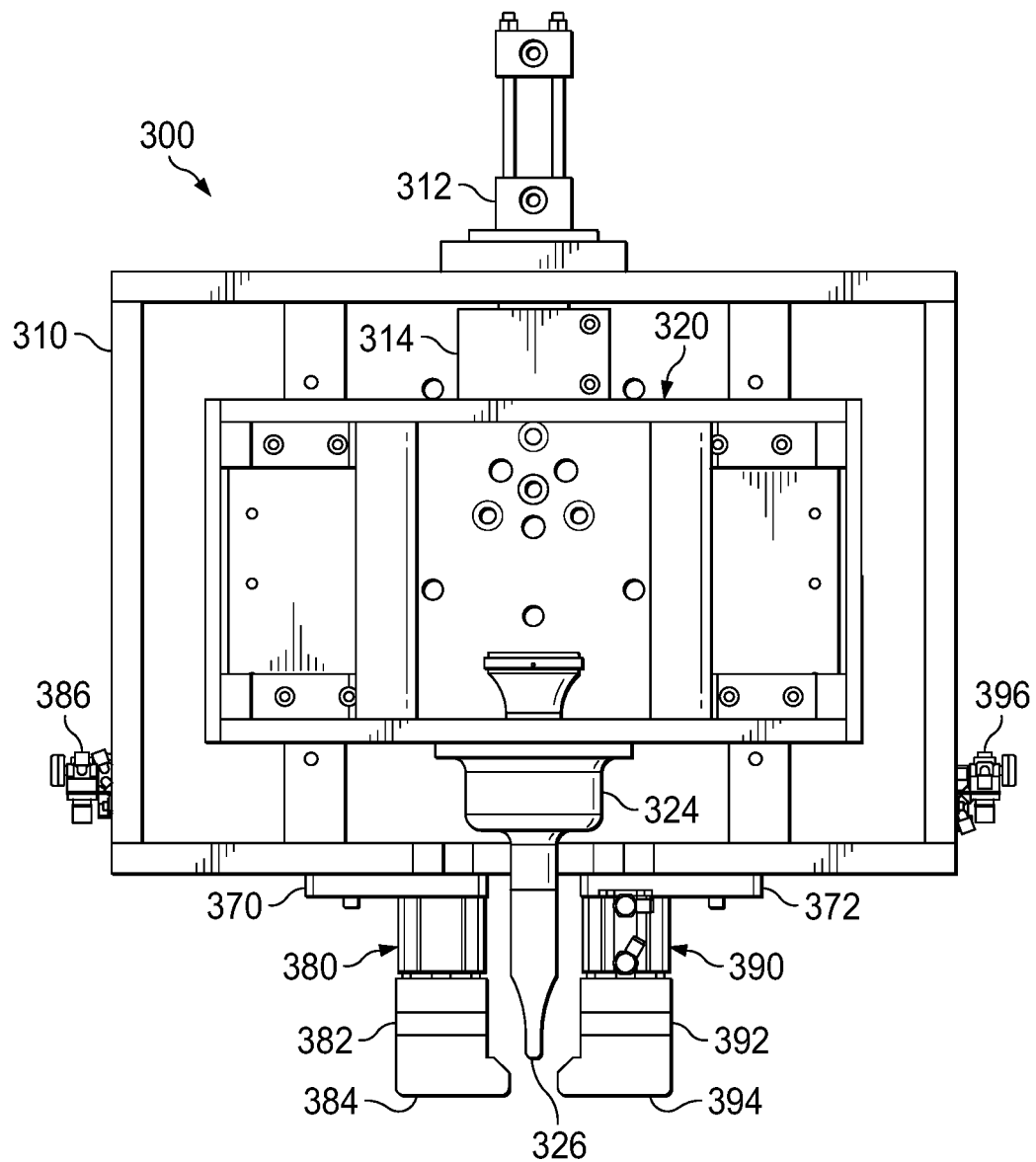
FIG. 3 is a front view of a system and apparatus for the ultrasonic consolidation of materials, in accordance with a third example implementation of the disclosed technology.

FIG. 3 provides a front view of a system and apparatus for the ultrasonic consolidation of materials, in accordance with a third example implementation of the disclosed technology. In FIG. 3, ultrasonic consolidation system 300 includes enclosure 310; ultrasonic stack actuator 312; closed loop force feedback sensor 314; and ultrasonic head assembly 320, which includes an ultrasonic transducer (not shown), rigid mount booster 324, and ultrasonic sonotrode 326. First adjustable cylinder mount 370 and second adjustable cylinder mount 372 are attached to the bottom portion of enclosure 310. Incoming material hold-down assembly 380 is attached to first adjustable cylinder mount 370 and includes thermal insulator 382 and chilled/heated region 382, which contacts the material to be consolidated or in some cases, the consolidating material. Pressure regulator 386, which controls the downward pressure of incoming material hold-down assembly 380, is attached to the side of enclosure 310. Processed material hold-down assembly 390 includes thermal insulator 392 and chilled/heated region 392, which contacts the processed (i.e., consolidated) material or in some cases, the consolidating material. Pressure regulator 396, which controls the downward pressure of processed material hold-down assembly 390, is attached to the side of enclosure 310.

Figure 4:
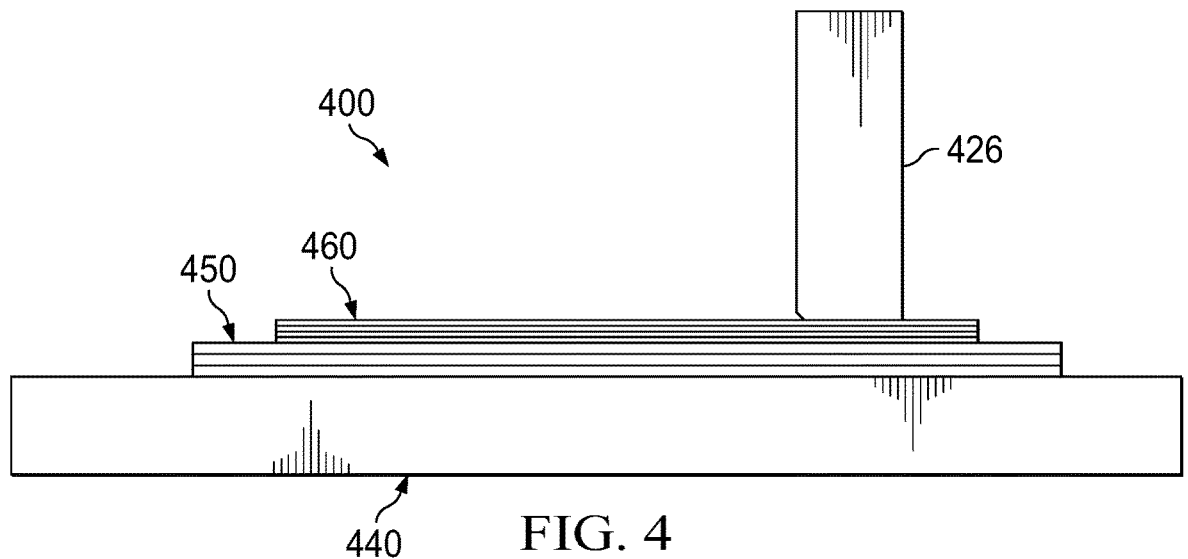
FIG. 4 depicts a first example configuration of the sonotrode, anvil, layer(s) of consolidating material, and layers of material to be consolidated placed relative to one another in accordance with the disclosed technology.

FIG. 4 depicts a first example configuration of the sonotrode, anvil, layer(s) of consolidating material, and layers of material to be consolidated placed relative to one another in accordance with the disclosed technology. In configuration 400, ultrasonic sonotrode 426 is positioned above or in close proximity to rigid anvil 440; a predetermined number or "N" layers of consolidating material 450 are positioned on rigid anvil 440; and a predetermined number or "N" layers of material to be consolidated 460 are positioned on consolidating material 450. The actual number of layers will be determined by a variety of factors including the specific material or materials being used for the consolidating material, the specific material or materials being consolidated, and the characteristics of the component or part being manufactured using the disclosed technology. In this implementation, ultrasonic sonotrode 426 is brought into contact with the uppermost layer of material to be consolidated 460 when the consolidation process begins.

Figure 5:
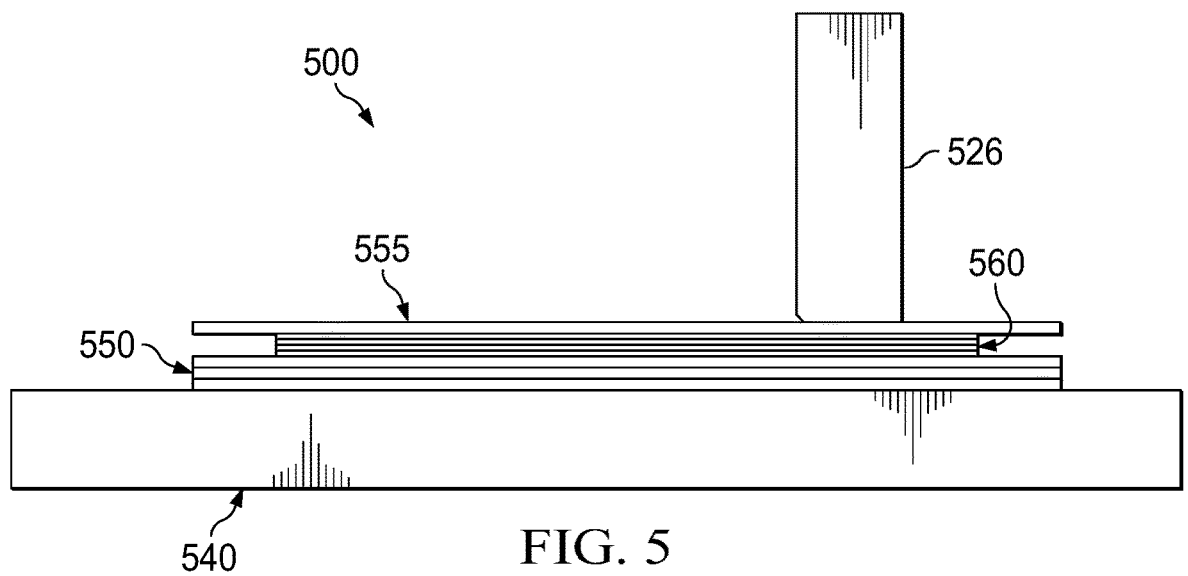
FIG. 5 depicts a second example configuration of the sonotrode, anvil, layer(s) of consolidating material, and layers of material to be consolidated placed relative to one another in accordance with the disclosed technology.

FIG. 5 depicts a second example configuration of the sonotrode, anvil, layer(s) of consolidating material, and layers of material to be consolidated placed relative to one another in accordance with the disclosed technology. In configuration 500, ultrasonic sonotrode 526 is positioned above or in close proximity to rigid anvil 540; a first predetermined number or "N" layers of consolidating material 550 are positioned on rigid anvil 540; a predetermined number or "N" layers of material to be consolidated 560 are positioned on consolidating material 550; and a second predetermined number or "N" layers of consolidating material 555 are positioned on the material to be consolidated 560. The actual number of layers will be determined by a variety of factors including the specific material or materials being used for the consolidating material, the specific material or materials being consolidated, and the characteristics of the component or part being manufactured using the disclosed technology. In this implementation, ultrasonic sonotrode 526 is brought into contact with the uppermost layer of the second predetermined number or "N" layers of consolidating material 555 when the consolidation process begins.

Figure 6:
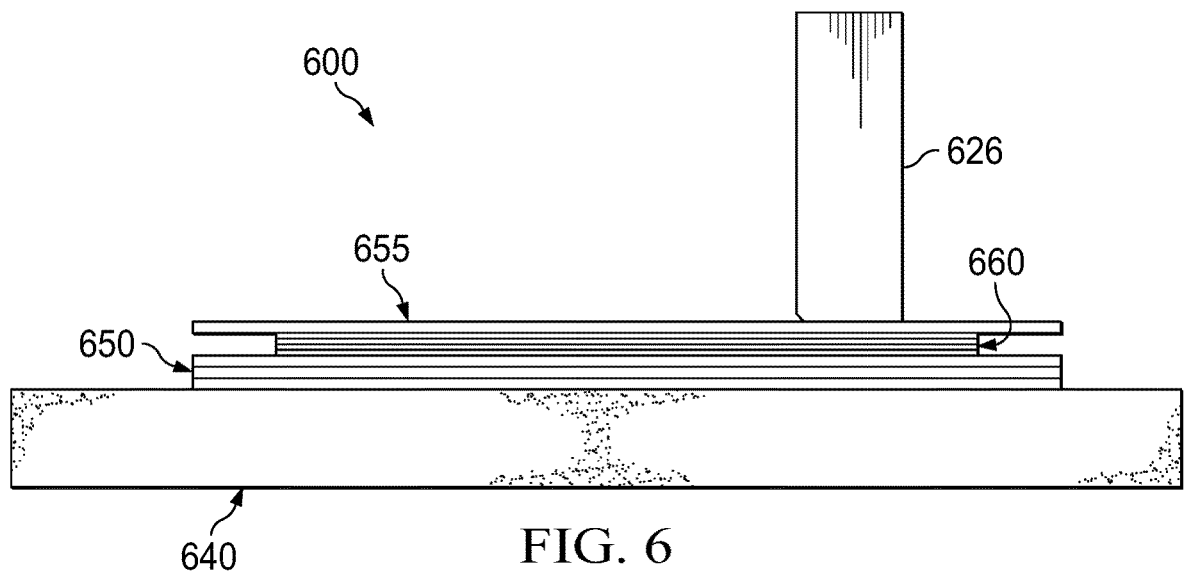
FIG. 6 depicts a third example configuration of the sonotrode, anvil, layer(s) of consolidating material, and layers of material to be consolidated placed relative to one another in accordance with the disclosed technology.

FIG. 6 depicts a third example configuration of the sonotrode, anvil, layer(s) of consolidating material, and layers of material to be consolidated placed relative to one another in accordance with the disclosed technology. In configuration 600, ultrasonic sonotrode 626 is positioned above or in close proximity to complaint anvil 640; a first predetermined number or "N" layers of consolidating material 650 are positioned on compliant anvil 640; a predetermined number or "N" layers of material to be consolidated 660 are positioned on consolidating material 650; and a second predetermined number or "N" layers of consolidating material 655 are positioned on the material to be consolidated 660. The actual number of layers will be determined by a variety of factors including the specific material or materials being used for the consolidating material, the specific material or materials being consolidated, and the characteristics of the component or part being manufactured using the disclosed technology. In this implementation, ultrasonic sonotrode 626 is brought into contact with the uppermost layer of the second predetermined number or "N" layers of consolidating material 655 when the consolidation process begins.

Figure 7:
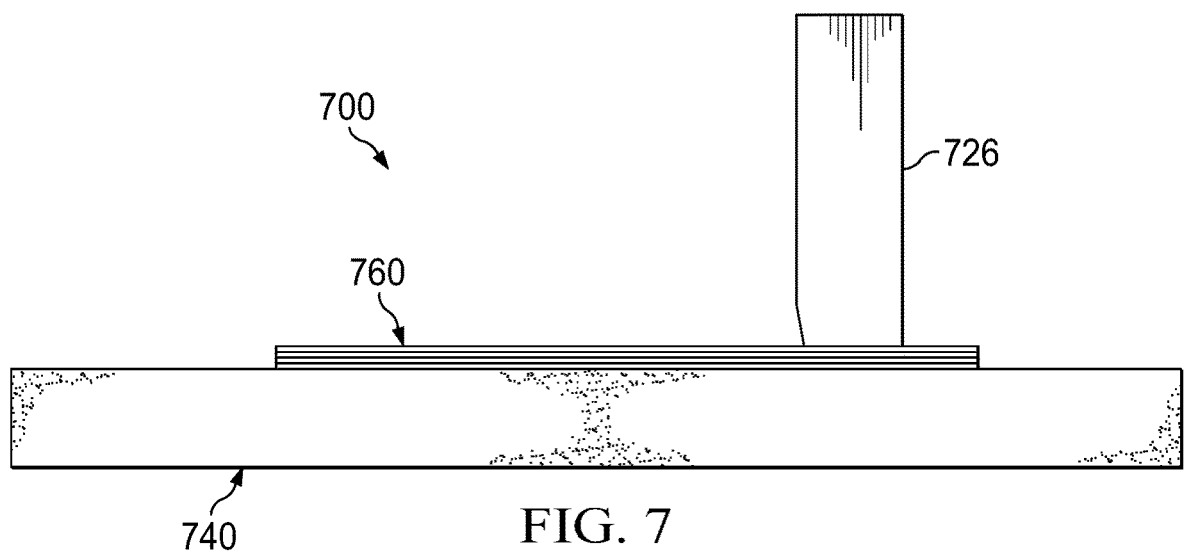
FIG. 7 depicts a fourth example configuration of the sonotrode, anvil, and layers of material to be consolidated placed relative to one another in accordance with the disclosed technology.

FIG. 7 depicts a fourth example configuration of the sonotrode, anvil, and layers of material to be consolidated placed relative to one another in accordance with the disclosed technology. In configuration 700, ultrasonic sonotrode 726 is positioned above or in close proximity to complaint anvil 740 and a predetermined number or "N" layers of material to be consolidated 760 are positioned on complaint anvil 740. The actual number of layers will be determined by a variety of factors including the specific material or materials being consolidated and the characteristics of the component or part being manufactured using the disclosed technology. In this implementation, ultrasonic sonotrode 726 is brought into contact with the uppermost layer of the material to be consolidated 760 when the consolidation process begins.

Figure 8:
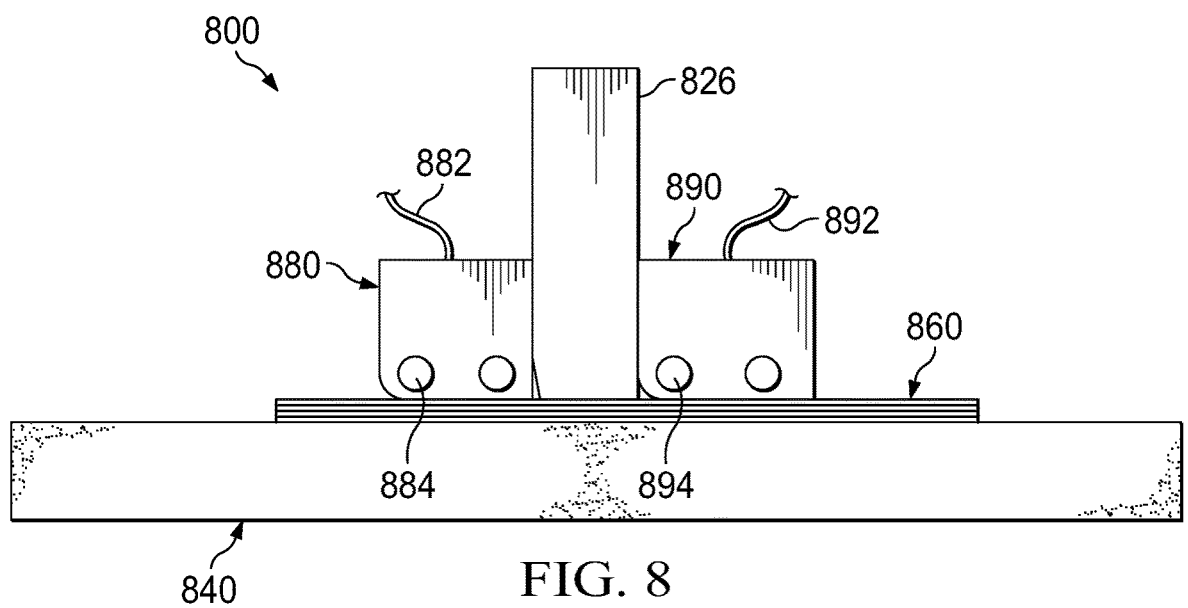
FIG. 8 depicts a fifth example configuration of the sonotrode, anvil, layer(s) of consolidating material, and layers of material to be consolidated placed relative to one another in accordance with the disclosed technology.

FIG. 8 depicts a fifth example configuration of the sonotrode, anvil, layer(s) of consolidating material, and layers of material to be consolidated placed relative to one another in accordance with the disclosed technology. In configuration 800, ultrasonic sonotrode 826 is positioned above or in close proximity to complaint anvil 840 and a predetermined number or "N" layers of material to be consolidated 860 are positioned on complaint anvil 840. The actual number of layers will be determined by a variety of factors including the specific material or materials being consolidated and the characteristics of the component or part being manufactured using the disclosed technology. In this implementation, ultrasonic sonotrode 826 is brought into contact with the uppermost layer of the material to be consolidated 860 when the consolidation process begins. Configuration 800 also includes the use of two anvils positioned on either side of ultrasonic sonotrode for applying downward force on the material to be consolidated (860) and for either heating or cooling the material being consolidated. As shown in FIG. 8, incoming material (pre-consolidation) anvil 880 includes thermocouple 882; and heating and cooling passages or elements 884. Outgoing material (post-consolidation) anvil 890 includes thermocouple 892; and heating and cooling passages or elements 894.

An important aspect of the disclosed technology is controlling process movements in conjunction with controlling ultrasonic processing parameters. The primary variables with respect to the ultrasonic process include, but are not limited to, ultrasonic amplitude, applied force, and total energy (i.e., energy per unit area). Machine specific parameters address or control when the ultrasonic input occurs, when the processing table starts moving, and processing speed. A control system offered to an operator permits the generation of unique processing conditions that impact weld/consolidation quality. These control features include: (i) ultrasonic activation; (ii) head actuation for programmed force; and (iii) welding motion, with a delay timer being as aspect of all three control features. Using these control features, an operator can determine when force is to be applied and for how long. The ultrasonics can then be triggered for a predetermined period of time before motion is induced. Additionally, these control features and be altered such that the ultrasonics are initiated before any force is applied. Then, force can be applied at a programmed value and motion can be initiated as desired. Advantages offered by the disclosed technology include decreased power consumption and processing times compared with other consolidation processes.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Also, it is noted that the implementations can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A system for consolidating materials, comprising:
   (a) a sonotrode configured to direct ultrasonic energy into materials to be consolidated, wherein the materials to be consolidated have both a glass transition temperature and a melting temperature;
   (b) a non-rigid consolidating material in proximity to the sonotrode, wherein the non-rigid consolidating material and sonotrode define a region therebetween for receiving the materials to be consolidated, wherein the non-rigid consolidating material contacts at least one of the materials to be consolidated without bonding thereto, wherein the non-rigid consolidating material is configured to ensure bonding of the materials to be consolidated, and
   (c) wherein the non-rigid consolidating material has a glass transition temperature that is higher than the glass transition temperature of the materials to be consolidated and a melting temperature that is higher than the melting temperature of the materials to be consolidated.

2. The system of claim 1, further comprising a rigid anvil for supporting the non-rigid consolidating material.

3. The system of claim 1, further comprising at least one of a force sensor and a thermal sensor.

4. The system of claim 1, further comprising an incoming material anvil positioned on one side of the sonotrode and an outgoing material anvil positioned on the opposite side of the sonotrode, wherein the anvils are configured to provide compressive force on the materials being consolidated, and wherein the anvils are configured to either cool or heat the materials being consolidated.

5. The system of claim 1, further comprising at least one ultrasonic transducer configured to provide ultrasonic energy to the sonotrode, wherein the at least one ultrasonic transducer is mounted in an articulated housing, and wherein the articulating housing is configured to provide the sonotrode with compressive force and varying angles of contact relative to placement of the materials to be consolidated.

6. The system of claim 1, wherein the sonotrode includes a radiused or tapered face profile, and wherein the sonotrode is configured for consolidating either narrow components of a predetermined width or wide components of a predetermined width.

7. The system of claim 1, wherein the sonotrode includes integrated hold-down structures configured to contact the materials being consolidated.

8. The system of claim 1, wherein the materials to be consolidated are thermoplastic materials, thermoset materials, or carbon fiber reinforced polymers.

9. The system of claim 1, wherein the materials to be consolidated are configured as layers of material, sheets of material, or preconsolidated structures.

10. The system of claim 1, wherein the non-rigid consolidating material includes thermoplastic material, thermoset material, silicone, polyamide, urethane, rubber, glass woven sheets, glass, carbon fiber material, and combinations thereof.

11. The system of claim 1, wherein the non-rigid consolidating material is configured as layers of material or sheets of material.

12. The system of claim 1, wherein the non-rigid consolidating material has a hardness between 40 and 100 Shore A.

13. A system for consolidating materials, comprising:
    (a) at least one ultrasonic transducer configured to provide ultrasonic energy to a sonotrode, wherein the at least one ultrasonic transducer is mounted in an articulated housing configured to provide the sonotrode with compressive force and varying angles of contact relative to placement of the materials to be consolidated, wherein the sonotrode is configured to direct ultrasonic energy into materials to be consolidated, and wherein the materials to be consolidated have both a glass transition temperature and a melting temperature;
    (b) a multi-layered, non-rigid consolidating material configured to ensure bonding of the materials to be consolidated, wherein the consolidating material has a thickness that decreases with increasing thickness of the materials to be consolidated, wherein the multi-layered, non-rigid consolidating material is in proximity to the sonotrode, wherein the multi-layered, non-rigid consolidating material and sonotrode define a region therebetween for receiving the materials to be consolidated, and wherein the multi-layered, non-rigid consolidating material has a glass transition temperature that is higher than the glass transition temperature of the materials to be consolidated and a melting temperature that is higher than the melting temperature of the materials to be consolidated; and
    (c) an incoming material anvil positioned on one side of the sonotrode and an outgoing material anvil positioned on the opposite side of the sonotrode, wherein the anvils are configured to provide additional compressive force on the materials being consolidated, and wherein the anvils are configured to either cool or heat the materials being consolidated.

14. The system of claim 13, further comprising a rigid anvil for supporting the multi-layered, non-rigid consolidating material.

15. The system of claim 13, further comprising at least one force sensor and at least one thermal sensor.

16. The system of claim 13, wherein the sonotrode includes a radiused or tapered face profile, wherein the sonotrode is configured for consolidating either narrow components of a predetermined width or wide components of a predetermined width, and wherein the sonotrode includes integrated hold-down structures configured to contact the materials being consolidated.

17. The system of claim 13, wherein the materials to be consolidated are thermoplastic materials, thermoset materials, or carbon fiber reinforced polymers, and wherein the materials to be consolidated are configured as layers of material or sheets of material.

18. The system of claim 13, wherein the multi-layered, non-rigid consolidating material includes thermoplastic material, thermoset material, silicone, polyamide, urethane, rubber, glass woven sheets, glass, carbon fiber material, or combinations thereof.

19. The system of claim 13, wherein the multi-layered, non-rigid consolidating material has a hardness between 40 and 100 Shore A.

20. A method for consolidating materials, comprising:
(a) configuring a sonotrode to direct ultrasonic energy into materials to be consolidated and exert compressive force on the materials to be consolidated, wherein the materials to be consolidated have both a glass transition temperature and a melting temperature;
(b) placing a non-rigid consolidating material with a plurality of layers in proximity to the sonotrode, wherein the non-rigid consolidating material and sonotrode define a region therebetween for receiving the materials to be consolidated, wherein the non-rigid consolidating material has a glass transition temperature that is higher than the glass transition temperature of the materials to be consolidated and a melting temperature that is higher than the melting temperature of the materials to be consolidated, wherein the non-rigid consolidating material contacts at least one of the materials to be consolidated without bonding thereto, and wherein the non-rigid consolidating material is configured to ensure bonding of the materials to be consolidated; and
(c) joining the materials to be consolidated by activating the sonotrode and moving the sonotrode across the materials under compressive force and at predetermined angles.

* * * * *